US008074199B2

(12) United States Patent
Millett et al.

(10) Patent No.: US 8,074,199 B2
(45) Date of Patent: Dec. 6, 2011

(54) UNIFIED MESSAGING STATE MACHINE

(75) Inventors: Thomas W. Millett, Seattle, WA (US); Srinivasa Manda, Sammamish, WA (US)

(73) Assignee: Microsoft Corporation, Redmond, WA (US)

(*) Notice: Subject to any disclaimer, the term of this patent is extended or adjusted under 35 U.S.C. 154(b) by 1077 days.

(21) Appl. No.: 11/860,028

(22) Filed: Sep. 24, 2007

(65) Prior Publication Data

US 2009/0083709 A1 Mar. 26, 2009

(51) Int. Cl.
G06F 9/44 (2006.01)
(52) U.S. Cl. .................. 717/100; 717/124
(58) Field of Classification Search .......... 717/100
See application file for complete search history.

(56) References Cited

U.S. PATENT DOCUMENTS

| | | | | |
|---|---|---|---|---|
| 6,425,119 | B1* | 7/2002 | Jones et al. | 717/100 |
| 7,197,460 | B1 | 3/2007 | Gupta et al. | |
| 7,200,559 | B2* | 4/2007 | Wang | 704/257 |
| 7,640,533 | B1* | 12/2009 | Lottero et al. | 717/108 |
| 7,801,728 | B2* | 9/2010 | Ben-David et al. | 704/270 |
| 7,899,160 | B2* | 3/2011 | Corcoran | 379/88.01 |
| 2002/0069060 | A1 | 6/2002 | Cannavo et al. | |
| 2002/0085020 | A1* | 7/2002 | Carroll, Jr. | 345/700 |
| 2003/0002634 | A1 | 1/2003 | Gupta et al. | |
| 2003/0235282 | A1 | 12/2003 | Sichelman et al. | |
| 2004/0230434 | A1* | 11/2004 | Galanes et al. | 704/270.1 |
| 2005/0114534 | A1 | 5/2005 | Lee | |
| 2006/0083357 | A1* | 4/2006 | Howell et al. | 379/88.04 |
| 2006/0083358 | A1 | 4/2006 | Fong et al. | |
| 2006/0206523 | A1* | 9/2006 | Gaurav et al. | 707/104.1 |
| 2007/0055751 | A1* | 3/2007 | Sundararaman et al. | 709/220 |
| 2007/0073544 | A1 | 3/2007 | Millett et al. | |
| 2007/0288128 | A1* | 12/2007 | Komer et al. | 701/3 |
| 2008/0109292 | A1* | 5/2008 | Moore | 705/9 |
| 2009/0055809 | A1* | 2/2009 | Campbell | 717/140 |

FOREIGN PATENT DOCUMENTS

| | | |
|---|---|---|
| EP | 1327974 A3 | 3/2003 |
| EP | 1701247 A2 | 9/2006 |
| WO | 0018100 A2 | 3/2000 |

OTHER PUBLICATIONS

Dianda et al., "Service Authoring for Third-Party Programmable, Service-Mediation-Enabled Feature Servers in the Multiservice Core," Bell Labs Technical Journal, Jun. 2001, 19pg.*
Liu et al., "V2 over IP: Telecom Service Application and Operational Architecture to Support Video and Voice," IEEE, 2005, 6pg.*

(Continued)

Primary Examiner — Li Zhen
Assistant Examiner — Ryan Coyer
(74) Attorney, Agent, or Firm — Merchant & Gould P.C.

(57) ABSTRACT

A unified messaging (UM) application benefits from platform independence and human intelligibility of eXtended Markup Language (XML). A finite state machine (FSM) of the UM application is created utilizing an XML feature to create a valid menu state based upon a UM software component. For a UM software component that is a context or setting of the UM application, an XML conditional attribute conditions a prompt, transition or grammar node of the UM FSM. For a UM software component that is an XML snippet, an XML importation element replicates the XML snippet upon compilation, avoiding time-consuming and error prone requirements for manual code duplication. For a UM software component such as an external method, function, variable or action, a function wrapping XML tool validates the existence of such external UM software components at build time and captures version information to verify the availability of the same version upon execution.

16 Claims, 9 Drawing Sheets

OTHER PUBLICATIONS

MicroSIP UA Toolkit Overview. Oct. 17, 2006. http://www.hssworld.com/voip/sip/MicroSIPUAToolkit/overview.htm.

Hobbs, et al. FASTUS: Extracting Information from Natural-Language Texts. http://www.ai.sri.com/pubs/files/356.pdf. Last accessed on May 29, 2007.

IBM. Developing Voice Applications, an IBM White Paper. Oct. 23, 2001. ftp://ftp.software.ibm.com/software/pervasive/info/products/Developing_Voice_Applications.pdf.

International Search Report mailed Jan. 12, 2009 for PCT Application Serial No. PCT/US2008/076588, 11 Pages.

* cited by examiner

UNIFIED MESSAGING STATE MACHINE

TECHNICAL FIELD

The subject invention relates generally to computer systems, and more particularly, the subject invention relates to systems and methods that facilitate dynamic configuration of menu driven communications applications via file declarations that specify menu activities, prompts, or transitions in a flexible, granular, and explicit manner and which are outside the domain of hard coded state machines or document servers.

BACKGROUND OF THE INVENTION

Communications technologies are at the forefront of rapidly changing requirements of the information age. Only a few short years ago, fax machine technologies threatened the traditional way of receiving information in the mail by electronically encoding content and delivering messages over phone lines. This technology revolutionized the way business had been conducted for hundreds of years. Almost as soon as fax machines became ubiquitous, a new technology known as electronic mail or e-mail began to overtake many applications that were previously and exclusively in the domain of fax machines. As e-mail applications grew, still yet other communications technologies evolved such as Instant Messaging services which again threatened older forms of communications. Along with text driven technologies such as e-mail and fax machines, voice communications have also changed from hard wired connections to the ever popular and growing wireless technologies of today.

In order to manage the wide range of communications options that are available to many users, Unified Messaging (UM) applications have begun to appear that provide a service for handling the many communications options available to users. Unified Messaging generally implies the integration of voice, fax, e-mail, and the like allowing a user to access any of these messages, anywhere, anytime, from any terminal of choice. One goal of a Unified Messaging system is to simplify and speed up communication processes to achieve time and cost savings within a corporation or other entity.

One common feature of modern communications systems is that users are generally given various configuration options from different style menus in order to tailor these systems for particular communications preferences. Thus, voice mail, Unified Messaging and other Intelligent Voice Recognition (IVR) applications have user interfaces that are typically menu driven. A menu consists of one or more prompts that can be played to an end-user on the phone, for example. A user makes menu selections by one or more methods such as by using dual tone multi frequency (DTMF) keypad. DTMF navigation techniques can prove cumbersome when many input options exist. Moreover, with increased use of hands-free communication devices, DTMF keypad entry may not be convenient or appropriate.

Recently, automatic speech recognition (ASR) has been employed to a certain degree in UM menu applications to make them easier to use. However, given the large variations in languages, dialects, speech patterns, and individual tendencies, ASR must handle a large number of possible speech scenarios in order to avoid a high percentage of failures. As such, hard coded solutions, such as conventional state machines, become impractical as being unable to accommodate new UM features without burdensome code development and testing.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The subject invention relates to systems and methods for programming of a unified messaging (UM) application. In particular, the benefits of platform independence and human intelligibility of eXtended Markup Language (XML) is employed by a programming environment to produce a finite state machine (FSM) of menu states defined by user prompts and transitions to another menu state in accordance with a user response. In one aspect, the programming environment uses an XML feature to create a valid menu state based upon the UM software component. Thereby, a menu of increased complexity can be created.

To the accomplishment of the foregoing and related ends, certain illustrative aspects of the invention are described herein in connection with the following description and the annexed drawings. These aspects are indicative of various ways in which the invention may be practiced, all of which are intended to be covered by the subject invention. Other advantages and novel features of the invention may become apparent from the following detailed description of the invention when considered in conjunction with the drawings.

DETAILED DESCRIPTION OF THE INVENTION

The subject invention relates to systems and methods that enable dynamic programming and execution of an electronic communications dialog as part of a unified messaging (UM) application. In particular, the benefits of platform independence and human intelligibility of eXtended Markup Language (XML) is employed by a programming environment to produce a finite state machine (FSM) of menu states defined by user prompts and transitions to another menu state in accordance with a user response. The programming environment uses an XML feature to create a valid menu state based upon the UM software component. Thereby, a menu of increased complexity can be created. In one aspect, for a UM software component that is a context or setting of the UM application (e.g., availability of a UM service for a particular user), the programming environment uses an XML conditional attribute to condition a prompt, transition or grammar node the UM FSM. Thereby, high level decisions can be introduced to a menu structure for a tailored response. In another aspect, for a UM software component of an XML snippet, the programming environment can utilize the XML importation element to replicate the XML snippet upon compilation, avoiding time-consuming and error prone requirements for manual code duplication. In yet another aspect, for a UM software component such as an external method, function, variable or action, the programming environment utilizes a function wrapping XML tool to validate the existence of such external UM software components at build-time and captures version information that serves to verify the availability of the same version upon execution. Thereby, system integrity is assured.

As used in this application, the terms "component," "file," "system," "object," "controller," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Figure 1:
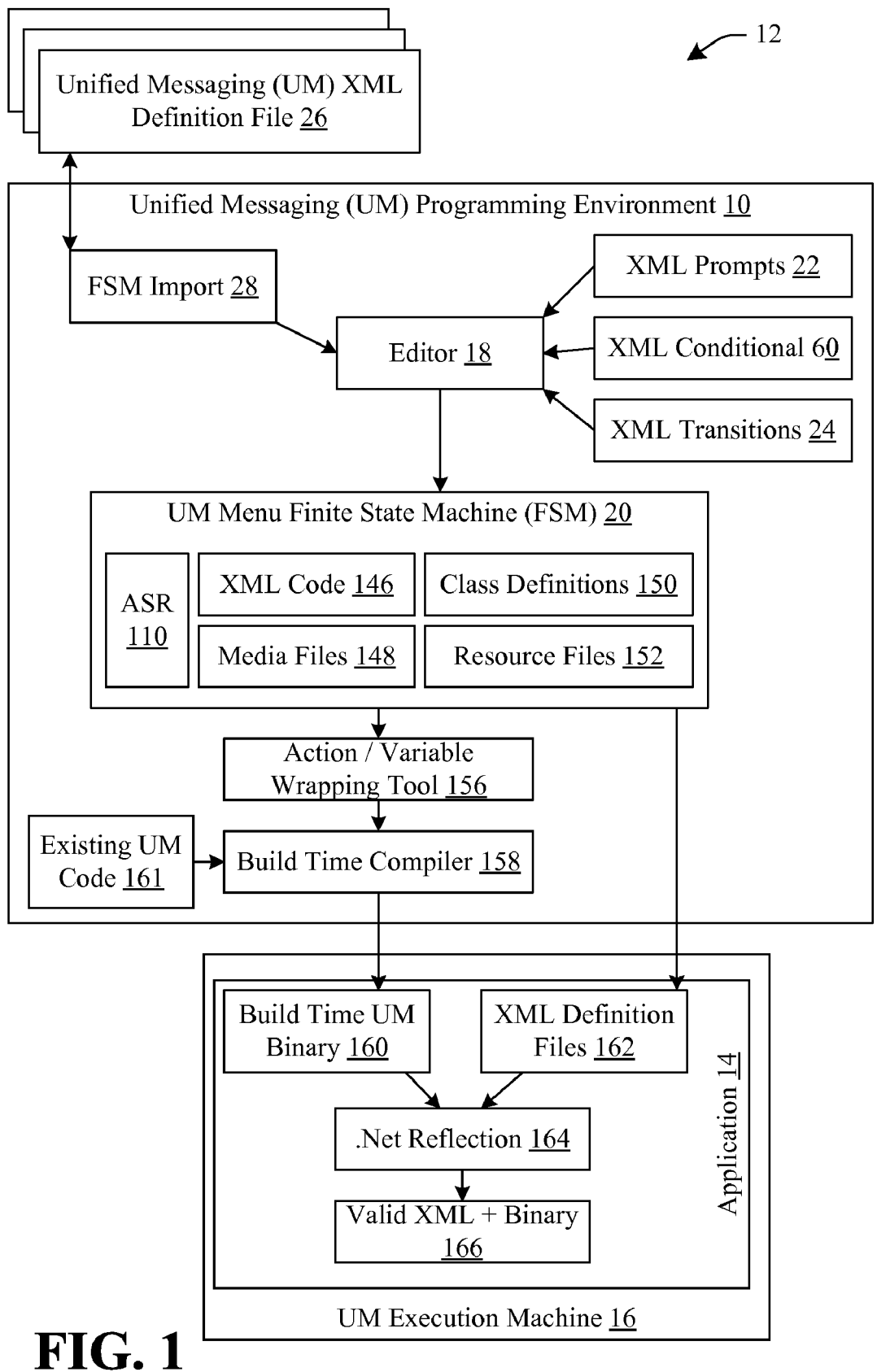
FIG. 1 depicts a schematic block diagram of a programming environment for a configurable messaging system in accordance with an aspect of the subject invention.

In FIG. 1, a Unified Messaging (UM) programming environment 10 of a UM implementation system 12 facilitates flexible programming constructs, reuse of existing program elements, and verification of the integrity of a produced UM application 14 produced by the programming environment 10 and used on a UM execution machine 16.

In an illustrative version, an editor 18 produces a UM menu finite state machine (FSM) 20 that can meet the rapidly changing needs of UM applications. To relieve the burdens of the hard coded nature and control elements for processing messages, an eXtensible Markup Language (XML) is used to create the FSM 20. XML is a general-purpose markup language classified as an extensible language because it allows its users to define their own tags. XML facilitates the sharing of structured data across different information systems, particularly via the Internet. Thus its usage encompasses both the document encoding arena and the data serialization arena.

A document (or a set of related documents called an application) forms the conversational UM finite state machine 20. The user is always in one conversational state, or dialog, at a time. Each dialog determines the next dialog to transition to. Transitions are specified with identifiers, which define the next document and dialog to use. A user interacts through a user interface (not shown) with the editor 18 to assemble dialogs/states, depicted as UM prompts 22, and transitions 24. Advantageously, the user can reuse XML snippets, depicted as UM XML definition files 26, because the programming environment 10 provides support for XML subroutines and file inclusions. For example, the code to 'find a user' using DTMF spelling is a fairly complex sequence of menus (e.g., the first one asking for the spelling, the second one confirming, another allowing the user to restart, another saying no results were found, etc.). In addition, that feature of 'find a user' is used in multiple locations (e.g., looking up a contact for the purpose of calling him, finding the address of a person to forward a voicemail, finding the address of a person to forward a meeting request, etc.). Consequently, there is a frequent need to duplicate XML snippets correctly for each context.

To that end, an XML language element called <FsmImport>, depicted at 28, is included in the state machine definition. The element includes the name of an 'FsmModule' and, optionally, a file reference. At system startup, the FsmImport tags are expanded into their referenced modules. For example, the following tag would be replaced by an XML block of code called 'SearchMenus' in the file 'Common.fsm':

<FsmImport file="common.fsm" module="SearchMenus'/>

Figure 2:
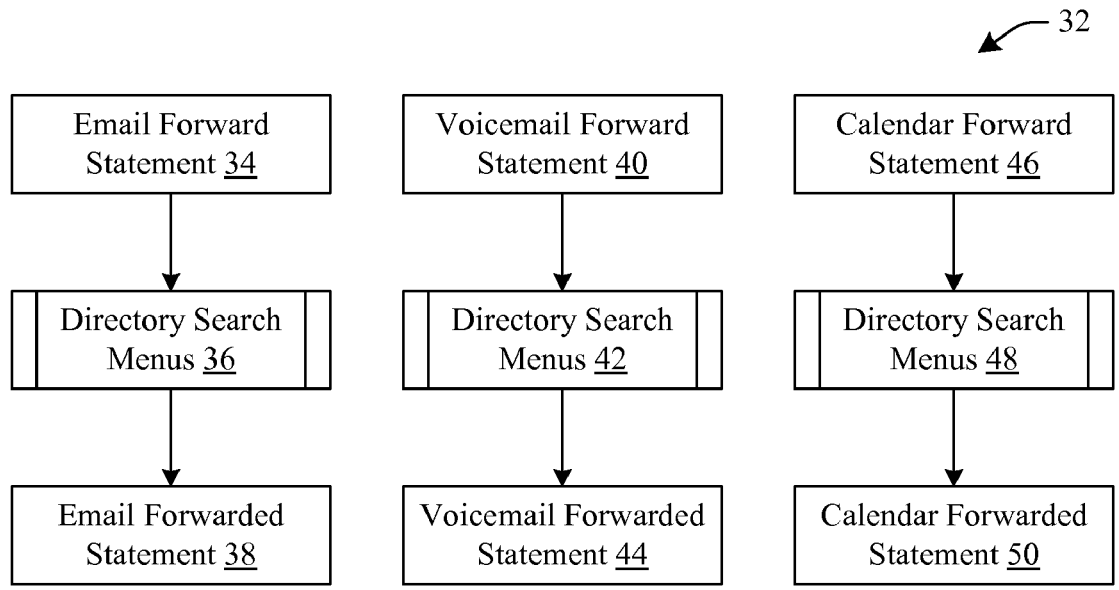
FIG. 2 depicts a block diagram of an exemplary menu option of the messaging system of FIG. 5.

FIG. 2 is a depiction of an application 32 that does not benefit from an import feature. Consider that the application 18 allows you to "forward" a variety of different exchange items to a user. For example, an email message, a voicemail message, or a calendar item can be forwarded. All of these options are expressed via different "menu states" in the XML definitions, because each is actually quite different from one another in many ways and require unique prompts and transitions. However, when it comes to figuring out who should receive the forwarded message, each is very similar, if not identical in this regard. An illustrative dialog for forwarding can go as follows:

System: "who do you want to forward this to?"
    User: "Tom"
    System: "I think you said John, is that right"
    User: "No, I said Tom"
    System: "Oh, OK. Tom, right"
    User: "Yes"

Such a dialog can actually be quite complex, requiring dozens of different menus interacting in complex ways. Each directory search menu has to be duplicated in each forwarding structure, depicted in FIG. 2 respectively as an email forwarding statement 34, passing through a directory search menu 36 to an email forwarded statement 38. A voicemail forwarding statement 40 passes through a first duplication of the directory search menu 42 to a voicemail forwarded statement 44. A calendar forwarding statement 46 passes through a second duplication of the director search menu 48 to a calendar forwarded statement 50.

Figure 3:
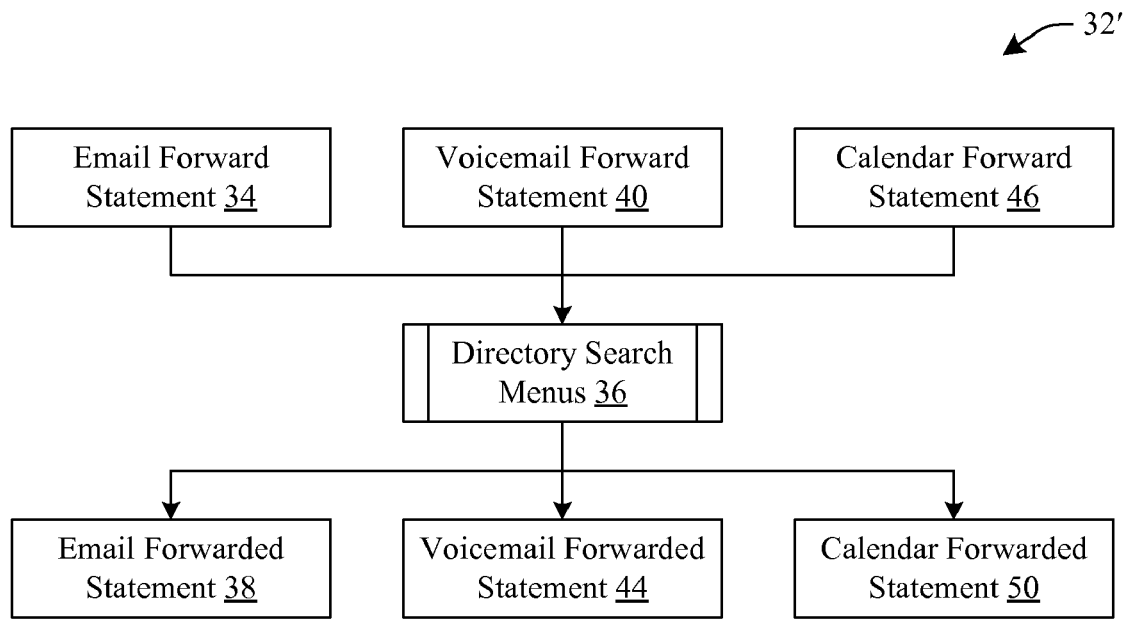
FIG. 3 depicts an illustrative depiction of an expansion of the menu option of FIG. 2.

In FIG. 3, a depiction illustrates how having a mechanism for "importing" subroutines at runtime avoids the need to duplicate such XML snippets. FsmImport terminology that appears in an XML configuration files consumes XML Fsm-Modules. A single copy of the directory search menu 36 may thus be reused to link the email forwarding statement 34 to the email forwarded statement 38, the voicemail forwarding statement 40 to the voicemail forwarded statement 44, and the calendar forwarding statement 46 to the calendar forwarded statement 50 to form a search menu 32'. The XML code for the search menu 32' can be written as Sample 1:

```
 1: <EmailManager>
 2:    <Menu id="EmailForwardStatement">
 3:       <Prompts>
 4:          <Prompt id="ForwardingEmail"/>
 5:       </Prompts>
 6:       <Transitions>
 7:          <Transition event="1" refId="SearchMenuStart"/>
 8:       </Transitions>
 9:    </Menu>
10:    <FsmImport file="Search.fsm"
         moduleId="CommonSearchMenus"/>
11: </EmailManager>
```

The tenth line tells the finite state machine engine, which consumes the XML definitions, to look in the file named Search.fsm and import those menu definitions, inline, into the EmailManager context. That's what enables the menu with ID EmailForwardStatement to reference the Menu named SearchMenuStart, which, otherwise does not appear in the EmailManager context since it is only in the referenced file.

Figure 4:
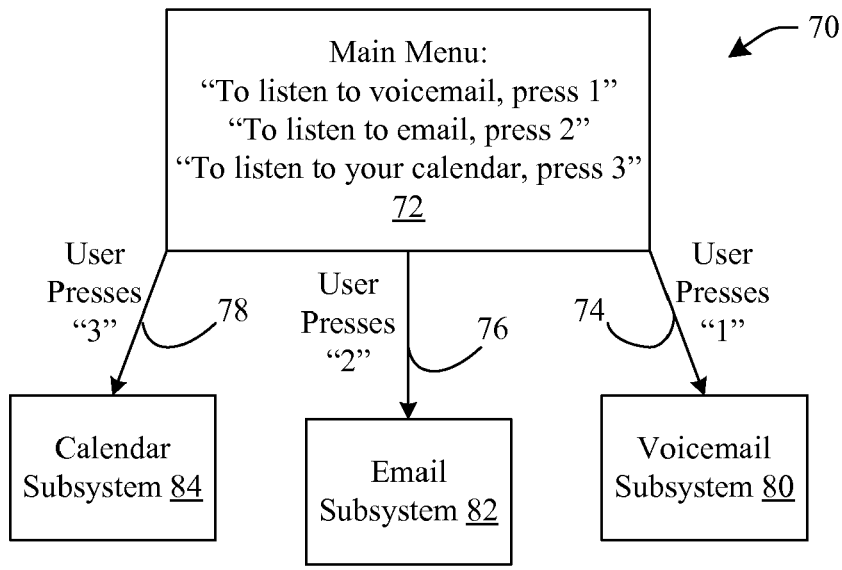
FIG. 4 depicts an illustrative depiction of a menu hierarchy in accordance with the messaging system of FIG. 3.

The editor 18 is also capable of utilizing an added XML element of conditional attributes 60 to state machine menu definitions to facilitate additional complexity and ease of programming of the FSM 20. Consider in FIG. 4, a menu 70 comprised of only four states created by a set of instructions to play to the user ("prompts") and what the next state should be based on user input ("transitions"). In the illustrative example, a main menu state 72 tells the user to press "1" for voicemail, "2" for email, or "3" for calendar. Depending on what the user presses, which is depicted as user presses "1" at 74, presses "2" at 76 or presses "3" at 78, the dialog moves to a respective state of voicemail subsystem 80, email subsystem 82 or calendar subsystem 84.

Encoding this information using XML can be as follows in Sample 2 for this particular menu 70:

```
<Menu id="MainMenuState">
   <Prompts>
      <Prompt id="mainMenu"/>
      <Prompt id="voicemailOption1"/>
      <Prompt id="emailOption2"/>
      <Prompt id="calendarOption3"/>
   </Prompts>
   <Transitions>
      <Transition event="1" refId="VoicemailSubsystem"/>
      <Transition event="2" refId="EmailSubsystem"/>
      <Transition event="3" refId="CalendarSubsystem"/>
   </Transitions>
</Menu>
```

It should be appreciated that each menu state 72, 80, 82, 84 live in a "context". The main menu state 72 lives in the "global manager context" in that there is an object in memory, called the GlobalManager, that stores some information pertinent to this particular menu. An example of code for GlobalManager can be as follows in Sample 3:

```
<GlobalManager>
   <Menu id="MainMenuState">
      <Prompts>
         <Prompt id="mainMenu"/>
         <Prompt id="voicemailOption1"/>
         <Prompt id="emailOption2"/>
         <Prompt id="calendarOption3"/>
      </Prompts>
      <Transitions>
         <Transition event="1" refId="VoicemailSubsystem"/>
         <Transition event="2" refId="EmailSubsystem"/>
         <Transition event="3" refId="CalendarSubsystem"/>
      </Transitions>
   </Menu>
</GlobalManager>
```

Figure 5:
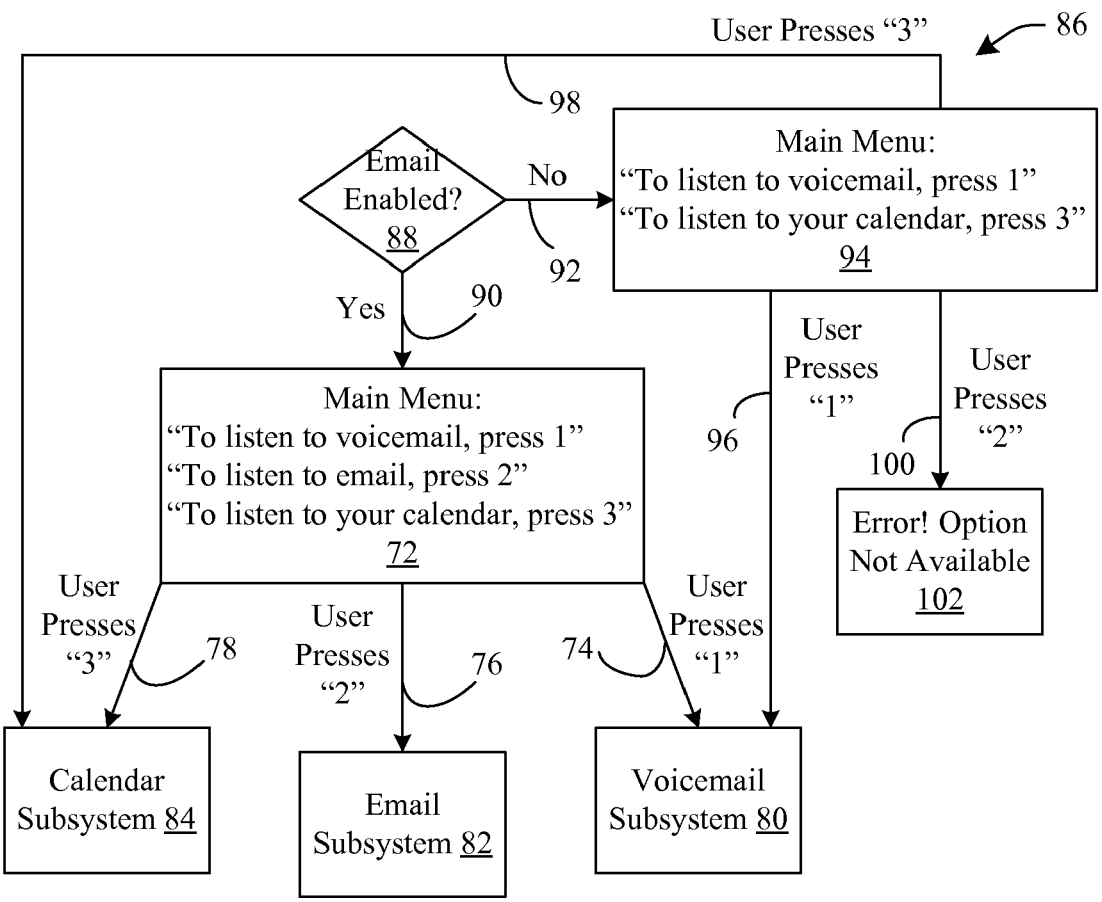
FIG. 5 depicts a block diagram of a menu hierarchy generated with importation of directory search menus per the programming environment of FIG. 1.

In FIG. 5, a UM menu 86 advantageously incorporates conditional XML element attributes. Consider that a feature design calls for the email option to only play if the administrator has specified a flag that allows the caller to access it. This can be thought of as introducing a top level decision, depicted as a email enabled conditional 88, before the main menu 72 state even starts. If a "Yes" flag exists at transition 90 from conditional 88, then main state 72 is achieved as previously described. However, if a "No" flag exists at transition 92 from conditional 88, an abbreviated main menu state 94 is entered. The user is prompted to enter a "1" for voicemail or a "3" for calendar, which result respectively in a transition for "1" at 96 to the voicemail subsystem state 80 and in a transition for "3" at 98 to the calendar subsystem state 84. If in a transition for "2" at 100, a state 102 for "error! Option not available" is entered. Thereby, the conditional 88 avoids a more cumbersome and error-prone menu structure.

Encoding the UM menu 86 can be achieved as in Sample 4:

```
<GlobalManager>
   <Menu id="MainMenuStateWithEmailOption">
      <Prompts>
         <Prompt id="mainMenu"/>
         <Prompt id="voicemailOption1"/>
         <Prompt id="emailOption2"/>
         <Prompt id="calendarOption3"/>
      </Prompts>
      <Transitions>
         <Transition event="1" refId="VoicemailState"/>
         <Transition event="2" refId="EmailState"/>
         <Transition event="3" refId="CalendarState"/>
      </Transitions>
   </Menu>
   <Menu id="MainMenuStateWithoutEmailOption">
      <Prompts>
         <Prompt id="mainMenu"/>
         <Prompt id="voicemailOption1"/>
         <Prompt id="calendarOption3"/>
      </Prompts>
      <Transitions>
         <Transition event="1" refId="VoicemailState"/>
         <Transition event="3" refId="CalendarState"/>
      </Transitions>
   </Menu>
</GlobalManager>
```

To extend this example, consider what happens if the administrator also chooses to disable calendar access conditionally. Conventionally, four menus would be required, such as: MainMenuAllOptions, MainMenuNoEmail, MainMenuNoCalendar, and MainMenuNoEmailNoCalendar.

By contrast, use of conditionals produces a more elegant approach by providing an extension to the XML definition that allows prompts and transitions to be applied conditionally, such as in Sample 5:

```
<Menu id="MainMenuStateWithEmailOption">
        <Prompts>
            <Prompt id="mainMenu"/>
            <Prompt id="voicemailOption1"/>
            <Prompt condition"IsEmailEnabled"
            id="emailOption2"/>
            <Prompt id="calendarOption3"/>
        </Prompts>
        <Transitions>
            <Transition event="1" refId ="VoicemailState"/>
            <Transition condition"IsEmailEnabled" event="2"
refId ="EmailState"/>
            <Transition event="3" refId ="CalendarState"/>
        </Transitions>
</Menu>
```

The variable name "IsEmailEnabled" is a Boolean (true/false) that lives in the Global Manager context. At runtime, the XML state machine engine will look at the XML and decide which elements should be "active" or not based on the runtime value their conditional attributes.

The condition attribute language is fairly robust, supporting logical operators AND, OR, NOT, GT (greater than), LT (less than), and some others, to combine context variables. For example, a prompt can be tagged with something like condition="IsEmailEnabled AND IsVoicemailEnabled". That expression would be parsed into a parse tree using a simple shift-reduce parser and evaluated at runtime.

The conditional attribute not only applies to prompts and transitions, but also to grammar nodes. So, you could have some command grammars conditionally active during an iteration of a speech menu. The general concept of automated speech recognition (ASR) is described in the commonly-owned and co-pending U.S. patent application Ser. No. 11/238,521, Publ. No. 2007/0073544 A1, the disclosure of which is hereby incorporated by reference in its entirety. Use of ASR, depicted at 110 in FIG. 1, is thus enhanced by the ability to readily import this mini-state machine to each appropriate portion of a speech menu as well as being more easily constructed with conditionals.

Figure 6:
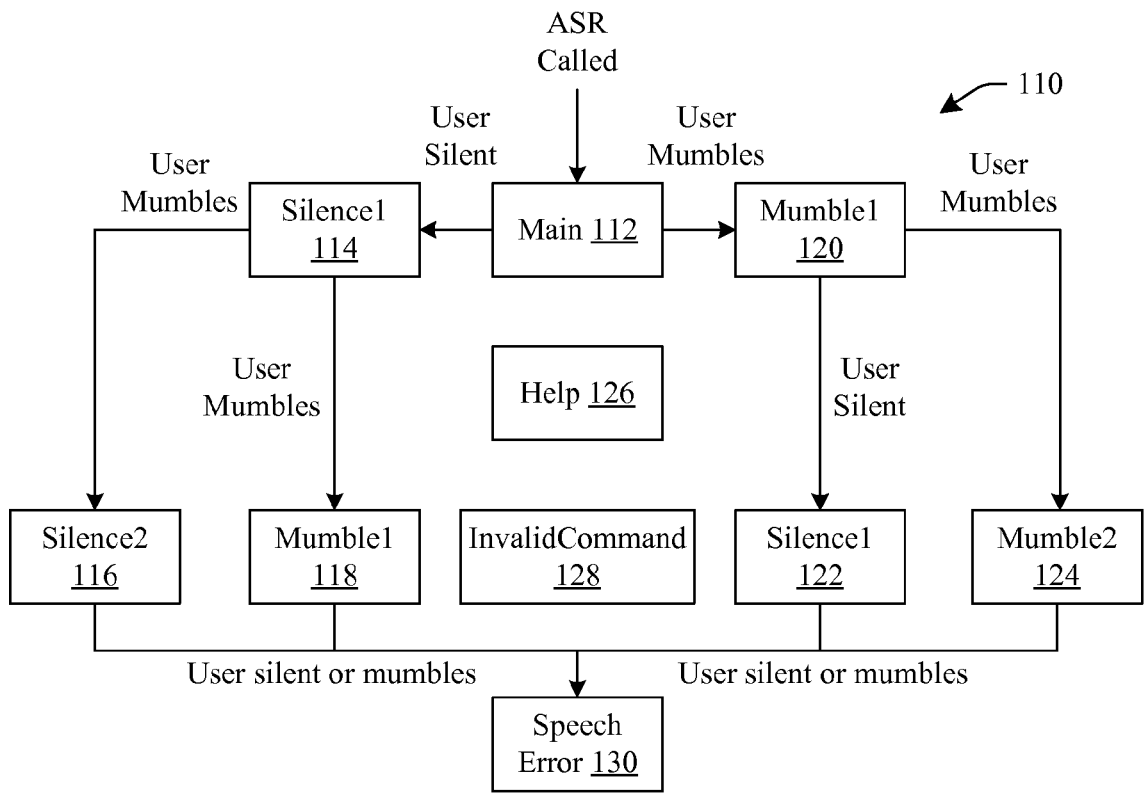
FIG. 6 is an exemplary block diagram of a menu hierarchy facilitated by use of the programming environment of FIG. 1.

In FIG. 6, an example of interaction with ASR 110, upon entering a main state 112, some voice response is expected from a user. This portion of the ASR 110 depicts when unable to obtain a meaningful response. In Silence1 state 114, a prompt plays if the user is silent (e.g., "sorry, I didn't hear you."). If a Silence2 state 116 occurs next, then prompt plays if the user is silent twice in a row (e.g., "sorry, I still didn't hear you."). If the user had made a mumble after the Silence1 state 114, then in Mumble1 state 118, a prompt plays (e.g., "sorry, I didn't catch that."). If the user made a mumble after main state 112 rather than a silence, another Mumble1 state 120 is initiated. If this followed by a silence, then a Silence 1 state 122 is invoked. If instead followed by another mumble, then a Mumble2 state 124 causes a prompt to play if the user is silent twice in a row (e.g., "sorry, I still didn't understand you. Here's what you can say . . . "). Then a help state 126 gives help prompts for this menu. Alternatively, a response from the user may be understood but be inappropriate for this menu, causing an InvalidCommand state 128 to give a prompt (e.g., "we understood what the user said, but what they said isn't a valid option at the moment", "sorry, I can't cancel this meeting because you're not the organizer", repeat the last thing the user said). After too many failed attempts (e.g., some string of three silences or mumbles), then a SpeechError state 130 informs the user of this failure and takes recovery action (e.g., "sorry I couldn't help you. Returning to the main menu")

Figure 7:
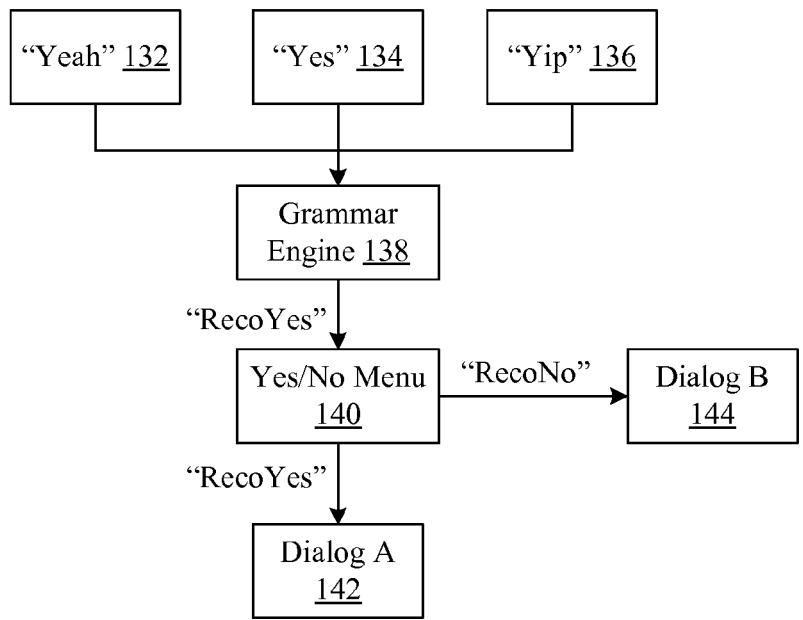
FIG. 7 is a block diagram of a call session enhanced by a grammar engine in accordance with an aspect of the subject invention.

In FIG. 7, if a meaningful response has been obtained from a user rather than mumbles or silences, then another aspect enhanced by importation and conditionals is how the user's speech is communicated to the state machine layer and consumed at the menu level. For example, there are many ways to say "yes". You can say "yeah, yep, yup, yessir, OK, sure" etc., which are all semantically equivalent to "yes" and are depicted at 132, 134, 136. By employing an "SML" semantic markup language, command grammars in a grammar engine 138 define a value for a "semantic event" that is communicated to the state machine, depicted as a Yes/No Menu 140 that responds to RecoYes with Dialog A 142 and to RecoNo with Dialog B 144. The menu never even knows what the user actually said.

Returning to FIG. 1, with the benefit of the importation and conditional features, the UM FSM 20 is produced, comprising of the ASR 110, XML code 146, media files 148, class definitions 150 and resource files 152. While coding with XML has a number of advantages, it may often be the case that variables or referenced files are missing. Such omissions would be detected quite late in the process of fielding a UM application 14. Thus, an action/variable wrapping tool 156 is part of a C# compilation phase, depicted as a build time compiler 158. The wrapping tool 156 consumes the state machine XML files and generates wrappers, depicted as UM build time binary 160, that reference methods and functions that are defined in existing C# (code) definitions 161 for their associated managers. For example, given a class named EmailManager that has a method called NextMessage that returns a string, an illustrative wrapper for this method can be as follows in Sample 6:

```
1    string NextMessage(EmailManager m)
2    {
3        return m.NextMessage( );
4    }
```

Because the parts "string NextMessage" of line 1 and "NextMessage" of line 3 are declared in XML definition files and used to generate the above wrapper, line 3 of the wrapper ensures that during normal compilation phase the class EmailManager actually has a method called NextMessage. In addition, line 3 of the wrapper ensures that the method NextMessage returns a string. If both checks are not satisfied, the wrapper causes a compilation error to occur.

Thus, use of the wrapping tool 156 assures that the XML definition files cannot reference a method or variable that does not actually exist in the code 161 that is also compiled, and that those methods and variables have the correct type (e.g., Boolean). If an XML definition file were to reference a non existing method or variable, the wrapping tool 156 generates these wrappers and then, in the "compile" phase, generate a build break. Once successfully compiled, a build time UM binary 160 is produced for exporting from the programming environment 10 along with the UM definition files 162.

For example, if the EmailManager class contained a method called NextMessage and the XML definition identified it as called NextMessageItem, and the tool has appropriately generated code wrappers, the C# compile phase would produce a build break. Then, a compile time error would be generated such as "ERROR: class EmailManager does not contain a definition for NextMessageItem". An example of such an implementation is giving as Sample 7:

```
//
//
//
internal class EmailManager
{
    internal static void
GetScope(Microsoft.Exchange.UM.UMCore.ActivityManager manager,
out Microsoft.Exchange.UM.UMCore.EmailManager scope )
        {
            scope = manager as
Microsoft.Exchange.UM.UMCore.EmailManager;
            while ( null == scope )
            {
                if ( null == manager.Manager )
                {
                    throw new
FsmConfigurationException(String.Empty);
                }
                else
                {
                    manager = manager.Manager;
                    scope = manager as
Microsoft.Exchange.UM.UMCore.EmailManager;
                }
            }
        }
//
// Action Proxies
//
//
//
        internal static TransitionBase
NextMessage(Microsoft.Exchange.UM.UMCore.ActivityManager
manager, string actionName, BaseUMCallSession vo)
        {
            Microsoft.Exchange.UM.UMCore.EmailManager
scope = manager as Microsoft.Exchange.UM.UMCore.EmailManager;
            if ( null == scope )
            {
                GetScope(manager, out scope);
            }
            return manager.GetTransition(scope.-
            NextMessage(vo));
        }
//
        // Variable Proxy
        //
        //
        //
        internal static System.Boolean
IsSentImportant(Microsoft.Exchange.UM.UMCore.ActivityManager
manager, string variableName)
        {
            Microsoft.Exchange.UM.UMCore.EmailManager
scope = manager as Microsoft.Exchange.UM.UMCore.EmailManager;
            if ( null == scope )
            {
                GetScope(manager, out scope);
            }
            return scope.IsSentImportant;
        }
```

The second part of verification occurs when the UM application 14 is installed and running on the UM execution machine 16. When the UM application 14 starts up, it reads the XML configuration files 162. When the UM application 14 come across an XML definition, for example in the EmailManager, that invokes some method on the EmailManager class, a .NET reflection 164 provided by the MICROSOFT .Net Platform finds the generated wrapper in the UM binary 160. Among other things, .Net reflection 164 allows a program written in C# to examine the program structure of another program written in C#. For example, a program can look through the binary content of another program and enumerate all its functions and their names. If that wrapper does not exist, then the XML file was not the one used at build time to generate the wrappers and a version mismatch error is given. Else, valid XML and binary is allowed to run, depicted at 166.

Use of .Net reflection compliments the verifications enabled by the wrapping tool 156 during the wrapping and compilation phases. In both cases, for the example of the wrapper code of Sample 6, the FSM definitions are examined to determine that the class called EmailManager has a method called NextMessage. In the wrapping phase, done at build time, this verification code is generated. In the reflection phase, done at run time, .Net reflection 164 ensures that the wrapper function actually exists in UM binary 160. Attempts to use an incorrect or corrupted version can thus be averted.

Figure 8:
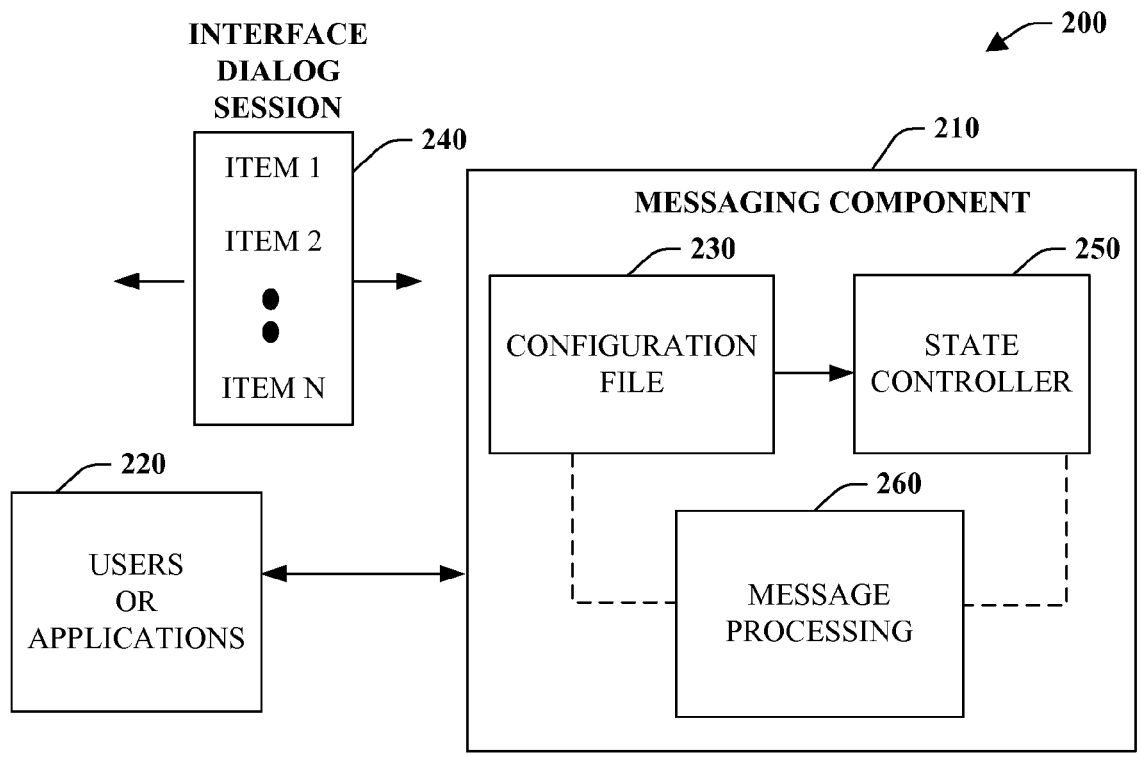
FIG. 8 depicts a schematic block diagram illustrating a configurable messaging system produced by the programming environment of FIG. 1.

In FIG. 8, a configurable messaging system 200 may be produced by the programming environment 10. The system 200 includes a messaging component 210 that interacts with one or more users and/or automated applications 220 to facilitate processing of various communications applications. The messaging component 210 can be associated with various applications such as Unified Messaging applications, voice mail processing, or substantially any type of voice recognition application. Typically, interactions with the messaging component 210 are through dual tone multi frequency (DTMF) inputs but other type of inputs such as speech or text inputs can operate as well.

In general, a configuration file 230 stores groups of instructions or commands that drive an interface dialog session 240 with the user or applications 220. Such instructions or commands can cause the dialog session 240 to generate and process one or more items of a menu for example, that collectively controls interactions with the user or applications 220. For example, a first item could be related to a greeting that identifies a session, a second item could ask for a password input, and a third item could request that a voice mail message be recorded in a file associated with the messaging component 210. As will be described in more detail below, the configuration file can specify activities, prompts, or transitions, that control the dialog session 240 and ultimately how the messaging component interacts with the users or applications 220.

The configuration file 230 generally specifies what activities are to be achieved in the dialog session 240 and which state to transition to after a given activity has completed or aborted, for example. The states are managed by a state controller 250 which directs a message processing component 260 (or components such as a service) to perform some action in the system 200 (e.g., record voice mail, playback message, examine user input, and so forth). The configuration file 230 allows administrators to dynamically adapt functionality of the messaging component 210 for a plurality of diverse communications applications. This is achieved by specifying dialog interactions or commands in an Extensible Markup Language (XML) or other type language that cooperate to control the state of the messaging component 210. In this case, instructions within the configuration file 230 remove hard coded state implementations from the state controller 250 and allow administrators to adapt to changing situations without also having to modify the state controller after making the changes.

Since transitions to other states are contained within the configuration file 230, dialog control can be dynamically specified on a granular level for a given dialog session 240 (e.g., specify transitions as a group within the file and not to an external document) while mitigating interactions with other computers/components to determine appropriate states or actions of the system 200. Thus, the subject invention facilitates configuring menus and its transitions for the dialog session 240 in an XML file (or other type) rather than hard coding these aspects in the state controller 250. This feature facilitates extensibility, wherein new menus and transitions can be added without change to the messaging component 210. Also, the configuration file 230 reduces application development time and allows customization whereby an administrator and end-user can potentially add new menus and change existing menu transitions to fit their needs. Other aspects include language support to add prompts, menus and transitions in other languages (e.g., German, French, English, and so forth), by merely modifying the configuration file 230 (or files) while the underlying application implementation of the messaging system 200 can remain unchanged. Additional aspects of an exemplary configuration file are described in the commonly-owned and co-pending U.S. patent application Ser. No. 11/068,691, Publ. No. 2007/0055751 A1, the disclosure of which is hereby incorporated by reference in its entirety.

Figure 9:
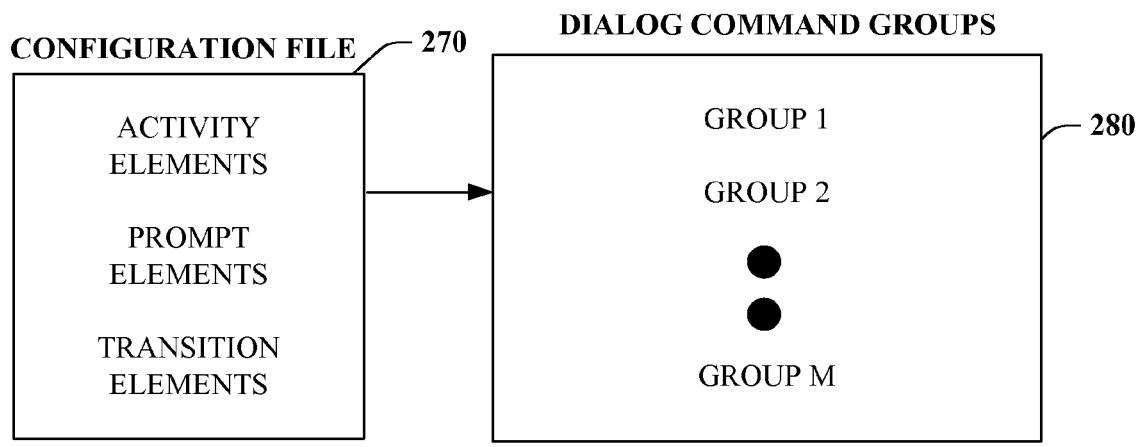
FIG. 9 depicts a block diagram illustrating an exemplary configuration file in accordance with an aspect of the subject invention.

Referring now to FIG. 9, an exemplary configuration file 270 is illustrated in accordance with an aspect of the subject invention. In general, the configuration file 270 includes activity elements, prompt elements, and transition elements that are arranged in one or more dialog command groups illustrated at 280 (e.g., group 101, 102, 103, and so forth), wherein such groups specify operations of a user interface or menu to interact with a communications or messaging system. For example, a telephony user interface (TUI) for a unified messaging example is described in an XML configuration file. Elements with an "id" attribute describe an activity. For instance, Menu, Record, and so forth are examples of activities. Prompt elements represent prompts to be played to the end-user, whereas Transition elements describe the next activity to be performed and the action to be taken before the transition.

Generally, one possible implementation of a dialog application includes a state machine with each state mapped to an activity in the configuration file 270. State transitions can be mapped to a transition element in XML, for example. Action attributes represent actions to be performed just before a state transition. Also, sub-state machine transitions are also supported in this model. For example, Record Voicemail can be a parent activity that has many sub-activities including menus and record. For example, a unified messaging application receives a call from the end-user, the XML configuration pertaining to that call (pre-loaded in memory) can be employed and the entire activity state machine executed for that call. This per-call granularity of loading configuration gives tremendous flexibility for administrators and end-users to extend, customize and support other languages.

Figure 10:
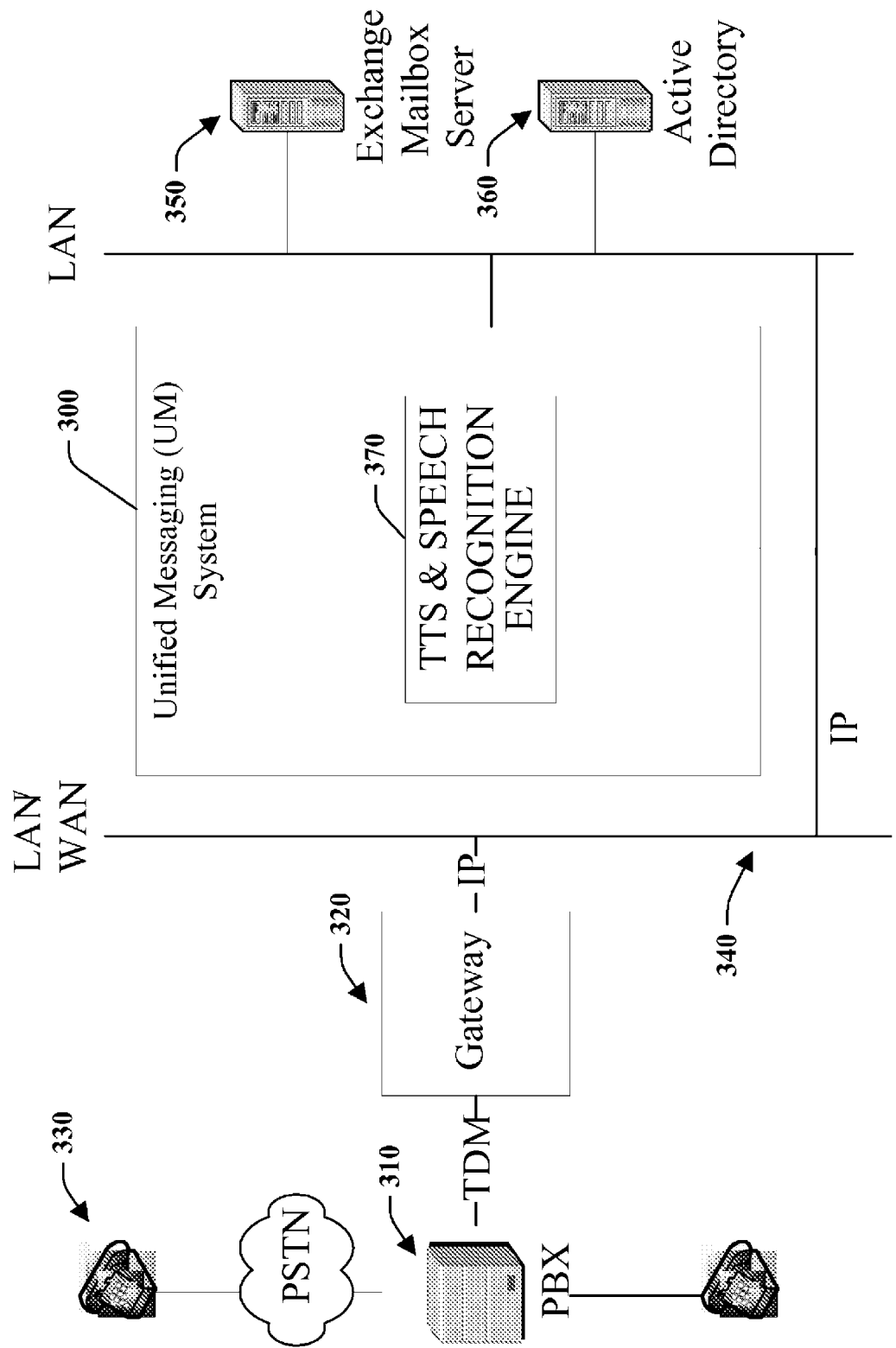
FIG. 10 depicts a block diagram of an exemplary unified messaging system in accordance with an aspect of the subject invention.

Turning to FIG. 10, an example unified messaging system 300 is illustrated in accordance with an aspect of the subject invention. In this example, the system 300 depicts how the unified messaging system 300 cooperates in the context of a PBX 310 and Session Initiation Protocol (SIP) Gateway 320. The Gateway 320 can route calls 330 (wired or wireless) to the unified messaging system 300 over an IP network 340 using the SIP protocol. This allows the unified messaging system 300 to not be collocated with the PBX 310. Other components can include a mailbox server 350 for storing messages and an active directory 360 to manage the messages. As illustrated, the unified messaging system 300 can include components such as a Text-to-Speech (TTS) and speech recognition engine 370 to process incoming calls 330 although other type of components such as a DTMF control can also be provided. It should be appreciated with the benefit of the present disclosure that a unified messaging service or service (not shown) can be provided that loads and executes a configuration file to create an interface session to interact with users (or applications) who generate the calls 330. This can include operation of various objects and classes that manage state operations of the system 300.

Figure 11:
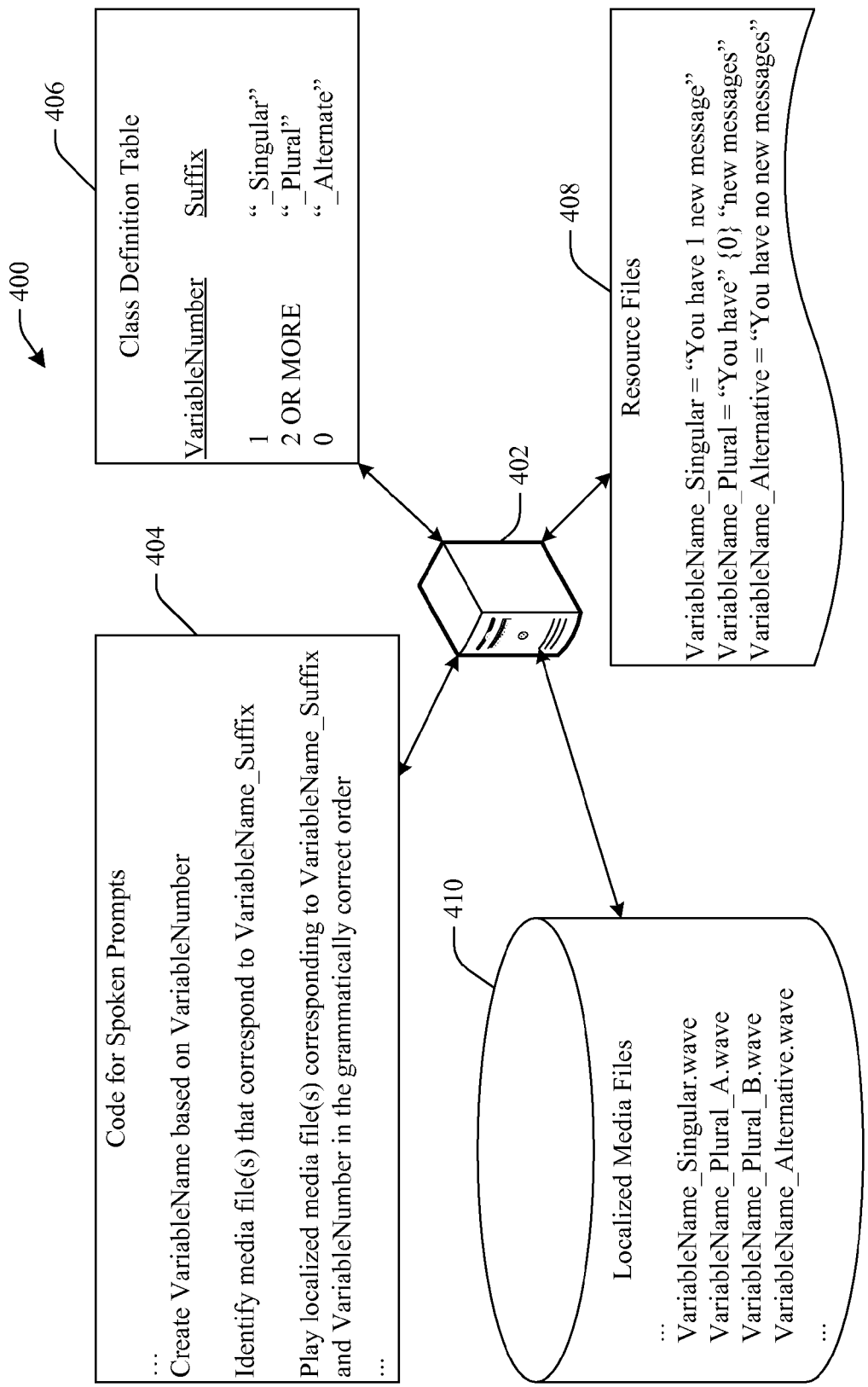
FIG. 11 depicts a block diagram of an exemplary unified messaging system with localization of message prompts.

In FIG. 11, the programming environment 10 of FIG. 1 advantageously supports and enhances the localization of message prompts as described in the commonly-owned and co-pending U.S. patent application Ser. No. 11/238,521, Publ. No. 2007/0073544 A1, the disclosure of which is hereby incorporated by reference in its entirety. A system 400 has computer 402, computer-executable code 404, class definition table 406, resource files 408, and localized media files 410. Computer 402 executes code 404 that specifies a method for rendering prompts (e.g., playing audio files representative of spoken prompts). System 400 advantageously enables resource strings and media files to be separately and individually modified or translated to a localized language without affecting any modifications to code 404. This significant advantage permits code 404 to be written once by programmers for use in a number of different localized languages. Once code 404 is created and resource strings are created in a particular language (e.g., English), translators can review the resource strings and provide localized translations of the resource strings (e.g., French). The translations are then saved in the localized resource files for the French language. Likewise, the translators can record spoken media clips of the resource strings and resource string fragments in the localized language (e.g., French) and save the recordings as localized media files that are accessed by computer 402 when playing localized media clips as called out by code 404.

For example, code 404 specifies creating a name (e.g., "Messages") assigned to VariableName based upon the value assigned to a KEY variable. Computer 402 accesses class definition table 406 to identify a grammar variable (e.g., "_Plural") that corresponds to the value of the KEY variable. Code 404 creates a new name (e.g., "Messages_Plural"), assigns the new name to VariableName, and instructs computer 402 to identify media files that correspond to the VariableName (i.e., "Messages_Plural"). Computer 402 accesses resource files 408 and locates the resource string that corresponds to VariableName. Computer 402 analyzes the resource string and determines the media file(s) that correspond to the resource string and the order of the media file(s) in the resource string. Computer 402 accesses the media file(s) that correspond to the resource string from localized media files 410. Code 404 then instructs computer 402 to render the localized media files in the grammatically correct order that is identified in the resource string.

In one version, the class definition table 406 contains a grammatical variable may be a prefix, suffix, or combination thereof. The grammatical variable is then appended to the name assigned to VariableName such that it corresponds to the grammatically correct resource string resource file associated with the numeric value of KEY. For example, if the value of KEY is "1", then the associated resource string would be a string that is grammatically correct for a singular value (e.g., "You have 4 new message"). If the value of KEY is "5", then the associated resource string would be a string that is grammatically correct for a plural value (e.g., "You have 5 new messages"). Alternatively, if the value of KEY is "0", then the associated resource string would be a string that is grammatically correct for a zero or null value (e.g., "You have no new messages").

In another version, resource strings located in resource files 408 are separate from code 404 and may be translated by local language translators to a non-English language without requiring code 404 to be modified or recompiled. During translation, the resource string and numeric variables may be translated to a local language and the resource string and numeric values may be rearranged in a grammatically correct order for the translated language. For example, the grammatically correct order and tense for the English resource string, "You have" {0} "new messages," contains the two text fragments "You have" and "new messages" where in this example "{0}" is a plural numeric value. If the resource was translated into French, however, one grammatically correct order and tense may be, {0} "nouveau messages sont arrives," wherein the numeric variable is located at the beginning of the sentence stating two or more messages were received.

In yet another version, the media files comprise localized recordings of resource strings and resource string fragments that correspond to the resource strings. The media files may also be recorded and utilized by code 404 without requiring code 404 to be modified or recompiled.

Thus, it should be appreciated with the benefit of the preceding disclosure that aspects can thus include DTMF-only UM applications, ASR-only UM applications, or hybrid DTMF/ASR UM applications.

Figure 12:
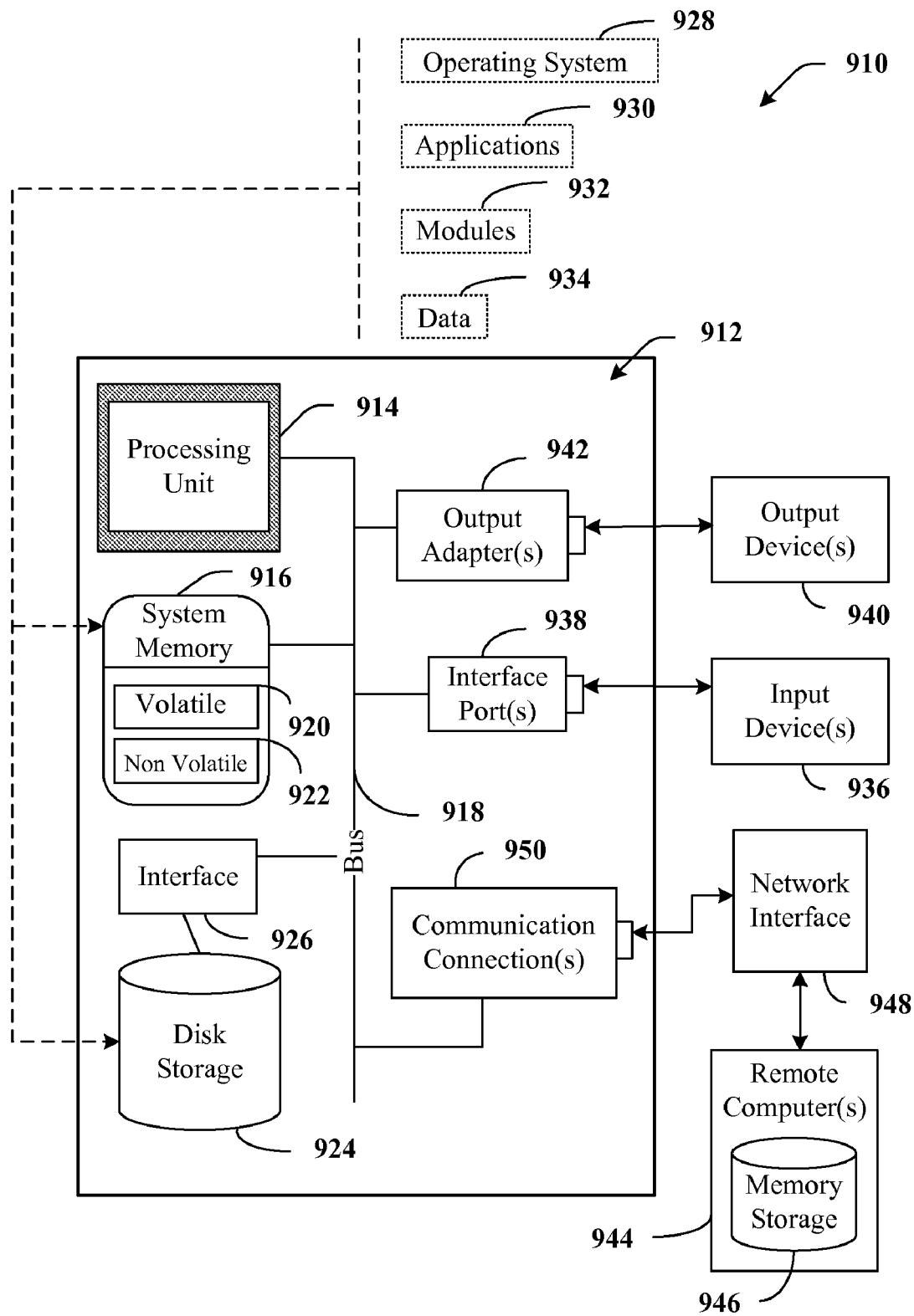
FIG. 12 depicts a schematic block diagram illustrating a suitable operating environment in accordance with an aspect of the subject invention.

With reference to FIG. 12, an exemplary environment 910 for implementing various aspects of the invention includes a computer 912. The computer 912 includes a processing unit 914, a system memory 916, and a system bus 918. The system bus 918 couples system components including, but not limited to, the system memory 916 to the processing unit 914. The processing unit 914 can be any of various available processors. Dual microprocessors and other multiprocessor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 916 includes volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable ROM (EEPROM), or flash memory. Volatile memory 920 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 912 also includes removable/non-removable, volatile/non-volatile computer storage media. FIG. 12 illustrates, for example a disk storage 924. Disk storage 924 includes, but is not limited to, devices like a magnetic disk drive, floppy disk drive, tape drive, Jaz drive, Zip drive, LS-100 drive, flash memory card, or memory stick. In addition, disk storage 924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 924 to the system bus 918, a removable or non-removable interface is typically used such as interface 926.

It is to be appreciated that FIG. 12 describes software that acts as an intermediary between users and the basic computer resources described in suitable operating environment 910. Such software includes an operating system 928. Operating system 928, which can be stored on disk storage 924, acts to control and allocate resources of the computer system 912. System applications 930 take advantage of the management of resources by operating system 928 through program modules 932 and program data 934 stored either in system memory 916 or on disk storage 924. It is to be appreciated that the subject invention can be implemented with various operating systems or combinations of operating systems.

A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port may be used to provide input to computer 912, and to output information from computer 912 to an output device 940. Output adapter 942 is provided to illustrate that there are some output devices 940 like monitors, speakers, and printers, among other output devices 940, that require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically includes many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/software employed to connect the network interface 948 to the bus 918. While communication connection 950 is shown for illustrative clarity inside computer 912, it can also be external to computer 912. The hardware/software necessary for connection to the network interface 948 includes, for exemplary purposes only, internal and external technologies such as, modems including regular telephone grade modems, cable modems and DSL modems, ISDN adapters, and Ethernet cards.

Figure 13:
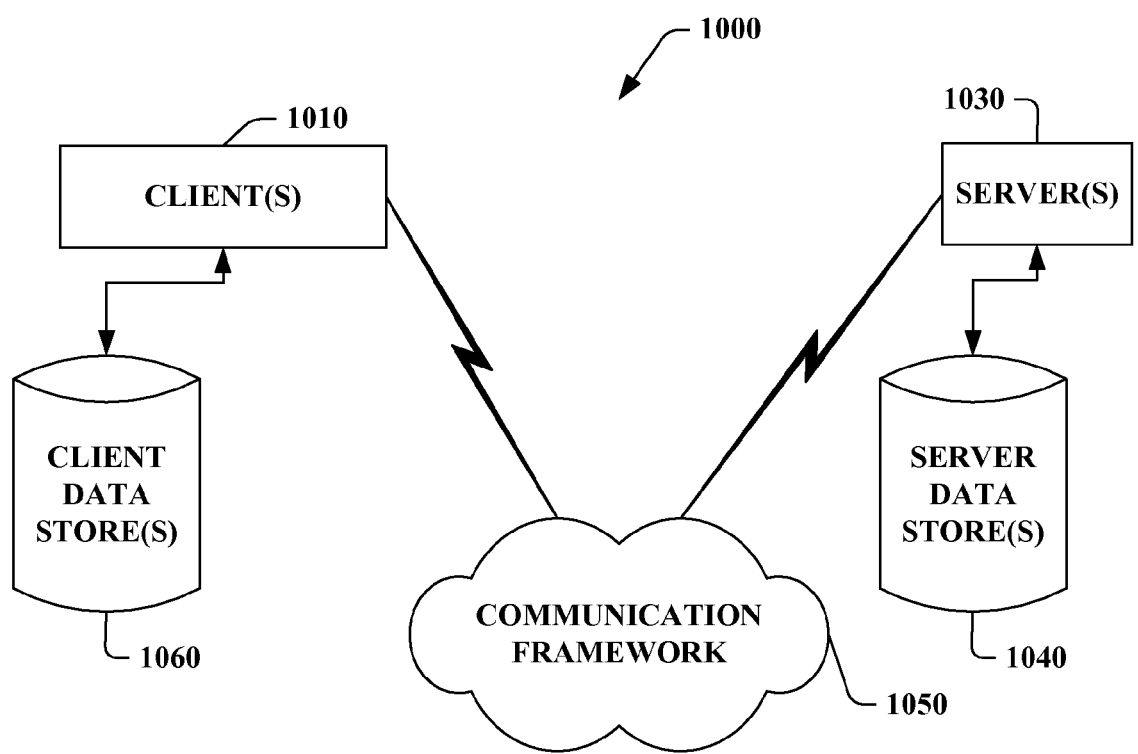
FIG. 13 depicts a schematic block diagram of a sample-computing environment with which the subject invention can interact.

FIG. 13 is a schematic block diagram of a sample-computing environment 1000 with which the subject invention can interact. The system 1000 includes one or more client(s) 1010. The client(s) 1010 can be hardware and/or software (e.g., threads, processes, computing devices). The system 1000 also includes one or more server(s) 1030. The server(s) 1030 can also be hardware and/or software (e.g., threads, processes, computing devices). The servers 1030 can house threads to perform transformations by employing the subject invention, for example. One possible communication between a client 1010 and a server 1030 may be in the form of a data packet adapted to be transmitted between two or more computer processes. The system 1000 includes a communication framework 1050 that can be employed to facilitate communications between the client(s) 1010 and the server(s) 1030. The client(s) 1010 are operably connected to one or more client data store(s) 1060 that can be employed to store information local to the client(s) 1010. Similarly, the server(s) 1030 are operably connected to one or more server data store(s) 1040 that can be employed to store information local to the servers 1030.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein, will only be incorporated to the extent that no conflict arises between that incorporated material and the existing disclosure material.

What is claimed is:

1. A computer-implemented system for programming a unified messaging (UM) application, comprising:
a user interface;
a programming environment operating on at least one computing device and accessed via the user interface for composing in an eXtensible Markup Language (XML) a UM finite state machine (FSM) comprising menu states defined by a plurality of user prompts and transitions between user prompts, each transition defined by a particular user response to a prompt;
a UM software component including an external software component called by the UM FSM;
an XML feature utilized by the programming environment to create a valid menu state based upon the UM software component, wherein the XML feature includes a function wrapper that is used by the programming environment to validate the external software component during a compilation phase when the external software component is present and generate a binary UM FSM, and to generate an error when the external software component is absent during the compilation phase; and
a verification tool invoked during execution of the binary UM FSM that confirms that a version of the external software component present during a compilation phase is the same as a version of the external software component available at execution.

2. The computer-implemented system of claim 1, wherein the UM software component comprises a setting of the UM application, the XML feature comprises a conditional attribute predetermining a transition of the UM FSM.

3. The computer-implemented system of claim 2, wherein the conditional attribute comprises an attribute composed of a context variable.

4. The computer-implemented system of claim 3, wherein the conditional attribute comprises an attribute composed of a plurality of context variables combined by at least one logical operator suitable for parsing into a parse tree.

5. The computer-implemented system of claim 2, wherein the UM software component comprises a grammar node, the XML feature comprises a conditional element attribute making a command grammar selectively active.

6. The computer-implemented system of claim 1, wherein the UM software component comprises an XML snippet, the XML feature comprising an importation element utilized by the programming environment to replicate the XML snippet upon compilation.

7. The computer-implemented system of claim 6, wherein the XML snippet comprises a speech menu defining prompts and transitions in response to a nonresponsive user utterance.

8. The computer-implemented system of claim 7, wherein the nonresponsive user utterance is one or more responses selected from a group consisting of a silence, a mumble, and a word not applicable in current context.

9. The computer-implemented system of claim 1, wherein the external software component is one of a group consisting of a method, function, variable and action.

10. The computer-implemented system of claim 1, further comprising an automated speech recognition menu for defining a semantic event as one of a plurality of user responses semantically equivalent to the user prompts, the transitions dependent upon a particular semantic event.

11. The computer-implemented system of claim 1, further comprising a dial tone multi frequency (DTMF) interface that defines a semantic event as a DTMF keypad input.

12. A method for developing a user interface to a unified messaging (UM) system, comprising:
generating a finite state machine with at least one computing device, the finite state machine composed of menu states prompting a user and transitions to a next menu state in accordance with a user response; and
generating a valid menu state based upon an existing external UM software component by employing an eXtensible Markup Language (XML) feature, wherein creating a valid menu state comprises:
generating a function wrapper for the XML feature;
during a compilation phase, using the function wrapper to validate the external UM software component when the external UM software component is present and generating a binary of the UM finite state machine; and during execution of the binary of the UM finite state machine, confirming that a version of the external UM software component present during the compilation phase is the same as a version of the external UM software component available at execution; and generating the valid menu state of the user interface including at least one user prompt.

13. The method of claim 12, wherein creating the valid menu state is based upon an XML snippet duplicated in the finite state machine by an XML importation element.

14. The method of claim 12, wherein creating a valid menu state is based upon a context variable referenced by an XML conditional attribute of an XML element defining a prompt or transition.

15. The method of claim 12, wherein creating a valid menu state is validated by wrapping called actions and variables of the finite state machine that reference in an external UM software component and creating a build time error if not locatable.

16. The method of claim 15, further comprising verifying that an external UM software component referenced by a compiled version of the finite state machine is identical upon execution as when validated.

* * * * *